Patented Aug. 25, 1931

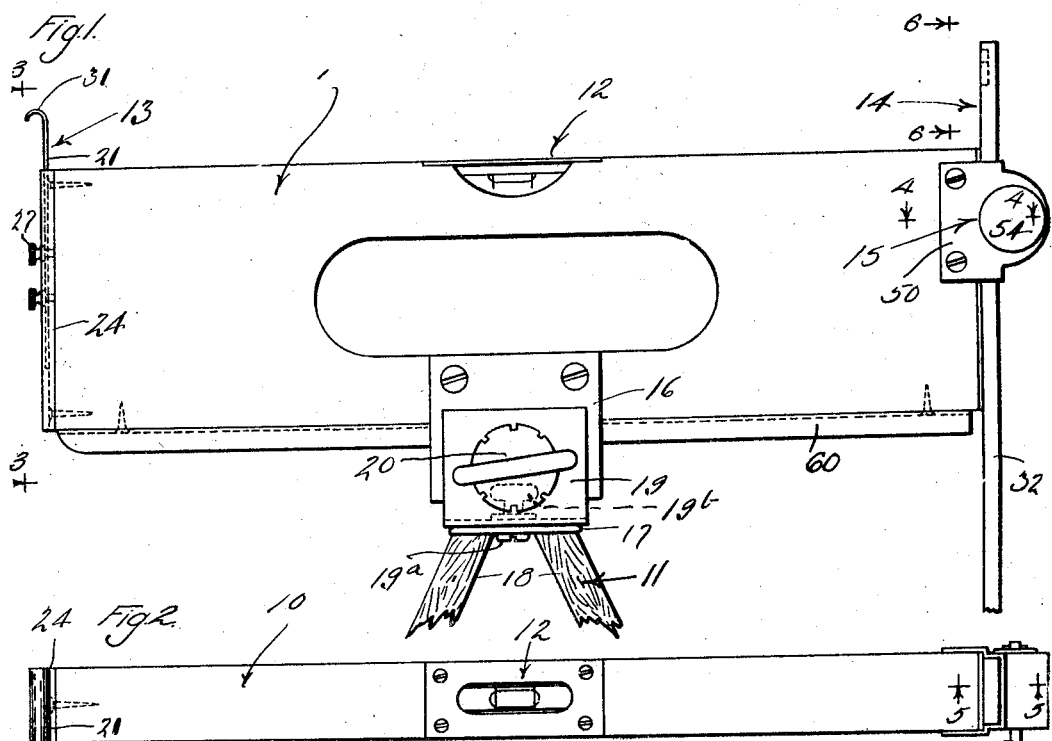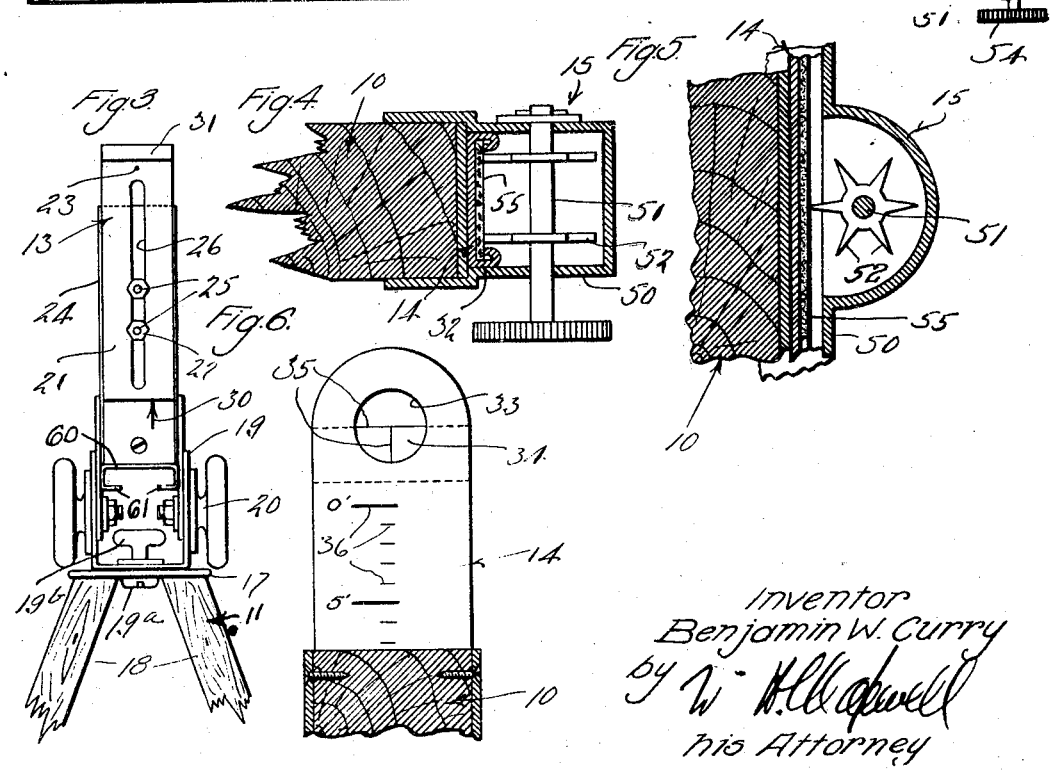

1,820,447

UNITED STATES PATENT OFFICE

BENJAMIN W. CURRY, OF VISALIA, CALIFORNIA

HEIGHT MEASURING DEVICE

Application filed August 27, 1928. Serial No. 302,346.

This invention has to do with a device or instrument for use in measuring the height of objects and it is an object of the invention to provide a simple, convenient and practical device of this character.

It is frequently necessary to measure the height of objects with a reasonable degree of accuracy. I will refer for example to the cruising of timber, the grading of land or waterways, the measuring of poles or the height of wires, etc. In the cruising of timber it is desirable to have a fairly accurate idea as to the height of the trees as well as their number; farmers and others often wish to know the height of high points of land or of water sheds, while public utilities corporations and other organizations having large numbers of poles find it advisable to make periodic surveys of the poles, which surveys require measuring the height of the poles.

It is well known, of course, that surveying instruments and other complicated and more or less expensive equipment are available for measuring operations such as I have referred to. The ordinary instruments that are available are rather expensive and difficult to handle and are only useful in the hands of skilled operators.

It is an object of my present invention to provide a height measuring instrument or device which can be operated to measure the height of objects without the exercise of great skill and without making calculations requiring a knowledge of the higher branches of mathematics.

It is an object of this invention to provide a device of the character mentioned which is simple and convenient to transport and handle, thus making it particularly suited for uses such as I have suggested.

It is a further object of this invention to provide an instrument of the character mentioned which can be easily and cheaply manufactured and which is free of delicate adjustments or parts liable to fail or become inoperative.

The various objects and features of my invention will be best and more fully understood from the following detailed description of a typical form and application of the invention, throughout which description I refer to the accompanying drawings, in which:

Fig. 1 is a side elevation of the instrument provided by my invention. Fig. 2 is a plan view of the instrument. Fig. 3 is an end elevation of the instrument being a view showing the rear end of the instrument as indicated by line 3—3 on Fig. 1. Fig. 4 is an enlarged detailed plan section taken as indicated by line 4—4 on Fig. 1. Fig. 5 is an enlarged vertical sectional view taken as indicated by line 5—5 on Fig. 2, and Fig. 6 is a vertical view taken as indicated by line 6—6 on Fig. 1.

The instrument comprises, generally, a body 10 forming a carrier or frame for various other parts of the instrument, a mounting or support 11 for the body means 12 for facilitating arrangement of the body in a horizontal position, a sight 13 at the rear end of the body 10, an adjustable scale 14 at the forward end of the body, and an adjusting means 15 for operating the scale.

The body 10 is an elongated member adapted to be arranged in a horizontal position and in practice is preferably formed of a block or body of wood. The body is provided intermediate its ends, preferably half way between its ends, with a downwardly projecting flange 16 to facilitate connection between the body and the support 11.

The support 11 may be any suitable type or form of means whereby the body can be arranged at a known height from the ground in a firm or rigid position. In practice it is convenient to use a simple light tripod having a head 17 and a plurality of folding adjustable legs 18. The head 17 of the tripod is provided with a bracket 19 to receive the flange on the body and a clamping screw 20 is provided for connecting the flange and bracket, as shown in Fig. 1 of the drawings. The bracket 19 is adjustably and pivotally mounted on the head 17 by a bolt $19^a$ provided with a wing nut $19^b$.

The means 12 provided for levelling or positioning the body 10 may be any suitable form of levelling device it being preferred to provide the device with a simple spirit level which can be readily mounted in the body 10, as clearly shown in Figs. 1 and 2 of the drawings. In the particular case illustrated the levelling means 12 is shown applied to the top of the body. It is obvious, however, that it can be arranged at any suitable point on the body where it will be convenient.

The sight 13 is mounted at the rear end of the body, and, in accordance with the invention, comprises a vertically movable slide 21 having a small opening or peep-hole 23 and a guideway 24 fixed to the rear end of the body 10 and slidably carrying the slide 21 so that it is adjustable vertically. The guideway 24 comprises a plate screwed or otherwise secured to the end of the body 10, and spaced studs 25 projecting from the plate and through a longitudinal slot 26 in the slide 21. Clamp nuts 27 are screw threaded on the studs 25 so that they can be operated to clamp the slide to the plate thus setting it against movement. The parts are proportioned so that the slide 21 can be lowered to an in or retracted position where it is even with the end of the body 10 and does not project in a manner to interfere with packing or handling of the device. For normal conditions of use the slide 21 is adjusted or moved upwardly to a predetermined position, for instance until a given part, for example the lower end, coincides with a mark provided on the fixed part or guideway. The said mark may be distinguished by a suitable legend, for instance it may be distinguished by an arrow 30 marked on the plate as shown in Fig. 3 of the drawings. In practice the slide 21 may have a projecting handle part 31 at its upper end whereby it can be easily engaged for purpose of operation. When adjusted to the desired position as shown in Fig. 3, the slide can be set by tightening the clamp nuts 27.

The adjustable scale 14 is an elongated member mounted at the forward end of the body 10 through the adjusting means 15 and adapted to be operated or adjusted so that its upper portion projects various distances above the body 10. In the construction illustrated the adjustable scale 14 is formed of a strip of sheet metal having its side edges turned to form flanges 32. An opening 33 of suitable size is formed in the scale at its upper end and a transparent body, for instance a glass, 34, is held by the flanges 32 to cover the opening. The glass 34 has a point marked on it as by two intersecting lines 35. The point of intersection of the lines 35 is the point to be sighted through the peep-hole 23 when measuring with the instrument. On one side, for example on the rear side of the scale, I provide a series of marks or graduations 36 adapted to cooperate with a fixed part such as the top edge of the body 10 past which the scale operates. The graduations 36 are laid off on the scale 14 in definite relation to the length or distance between the slide 21 and the scale 14 and a predetermined distance that the instrument is to be spaced horizontally from the object to be measured. Further, the indications on the scale may be laid off to take into account a definite spacing of the instrument above the ground when in operating position, for instance it may be presumed that the instrument is normally placed, say five feet above the ground.

The adjusting means 15 provided for actuating the scale 14 includes a bracket 50 attached to the forward end of the body 10 forming a guideway slidably holding the scale 14 and carrying a shaft 51. The bracket 50 may be formed of sheet metal and may be screwed or otherwise attached to the body. The shaft 51 extends between opposite sides of the bracket and carries spaced wheels having pointed teeth 52 for engaging and actuating the scale. One end of the shaft 51 projects from the bracket and carries an operating knob 54.

In accordance with the invention, I provide a lining in the scale 14 suitable for cooperation with the teeth 52. In the preferred construction the lining 55 is clamped or held to the outer or front face of the scale 14 by the flanges 32 and is formed of a strip of heavy fabric, or the like. This construction provides an effective drive between the shaft 51 and the scale 14 so that the scale can be readily adjusted by operation of the knob 54.

The indications or graduations 36 on the scale 14 being laid off for a predetermined spacing of the instrument from the object to be measured, the operator first locates the instrument the said predetermined distance from the object. Likewise the graduations being laid off for a given spacing of the instrument from the ground, the operator sets the tripod so that the device is at the desired height and the body 10 level, the level of the body being indicated by the means 12. The slide 21 having the sight opening 23 is then moved upwardly to operating position, as shown in Fig. 3, whereupon the operator sights the top of the object to be measured through the peep-hole 23 and adjusts or operates the scale 14 until the point designated by the marks 35 coincides with a line between the peep-hole and the top of the object. The indications or graduations 36 on the scale 14 will then show directly in feet or other units of measurement the height of the object from the ground. It is obvious that this is a simple matter of triangulation in which the horizontal distance from the object to the instrument forms one side,—the base of a right triangle—while the height of the object is the other side at right angles to the base. The hypotenuse of the triangle is the line along which the sighting is done. With the various known factors above described, it is obvious a very simple matter to graduate or lay off the marks 36 on the scale so that the readings, or height, are obtained directly by merely sighting the top of the object as above described. Further, it will be apparent that very little skill or manipulation enables an operator to use the device in measuring the height of objects where it is impossible or inconvenient to locate the instrument the predetermined distance from the base of the object or where the instrument cannot be arranged at the desired or predetermined height. Such variations, of course, require the application of certain simple rules of mathematics, as the correct answer, or height, is not obtained directly from the readings on the scale 14.

When the instrument is not in use, the scale 14 can be removed from the means 15 and placed in a holder 60 provided longitudinally on the body, for instance along the bottom of the body, as clearly shown in the drawings. The holder 60 may have inwardly extending flanges 61 to support the scale 14.

Having described only a typical preferred form of my invention, I do not wish to limit myself to the specific details set forth, but wish to reserve to myself any changes or variations that may appear to those skilled in the art or fall within the scope of the following claims:

Having described my invention, I claim:

1. An instrument of the character described including, an elongated body, an adjustable sight on one end of the body movable to an operating position where it projects from the body, a support for the body, an adjustable scale on the other end of the body, and rotatable means to adjust the scale, said scale having graduations thereon to cooperate with the body, and also having a point thereon to be sighted from the sight.

2. An instrument of the character described including, an elongated body, a sight on one end of the body movable to operating position where it projects from the body, a support for the body, a vertically adjustable scale on the other end of the body, the scale having graduations to cooperate with a fixed part and having a point to be sighted from the sight, and means for operating the scale including a rotatable part on the end of the body, a body of fabric on the scale, and teeth carried by the rotatable part to engage the fabric.

3. An instrument of the character described including, an elongated body, a mounting for supporting the body at a predetermined height, a sight on one end of the body movable from a position where it does not project from the body to operating position where it projects upwardly from the body, a vertically adjustable scale on the other end of the body having graduations to cooperate with a fixed part and a point to be sighted from the sight, the scale being detachable from the body, means for operating the scale including a rotatable part on the body, a body of fabric on the scale, and teeth carried by the rotatable part to engage the fabric, and a holder for the scale carried longitudinally on the bottom of the body.

In witness that I claim the foregoing I have hereunto subscribed my name this first day of August, 1928.

BENJAMIN W. CURRY.